(12) United States Patent
Brandon et al.

(10) Patent No.: US 12,098,929 B2
(45) Date of Patent: Sep. 24, 2024

(54) AUGMENTED REALITY FOR PROVIDING AUTONOMOUS VEHICLE PERSONNEL WITH ENHANCED SAFETY AND EFFICIENCY

(71) Applicant: GM Cruise Holdings LLC, San Francisco, CA (US)

(72) Inventors: Jeffrey Brandon, Phoenix, AZ (US); Domenico Rusciano, Concord, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 155 days.

(21) Appl. No.: 17/409,205

(22) Filed: Aug. 23, 2021

(65) Prior Publication Data
US 2023/0054771 A1 Feb. 23, 2023

(51) Int. Cl.
| | |
|---|---|
| *G01C 21/36* | (2006.01) |
| *B60W 50/14* | (2020.01) |
| *B60W 60/00* | (2020.01) |
| *G01C 21/34* | (2006.01) |
| *G02B 27/01* | (2006.01) |
| *G06F 3/14* | (2006.01) |
| *G08G 1/14* | (2006.01) |

(52) U.S. Cl.
CPC ......... *G01C 21/3626* (2013.01); *B60W 50/14* (2013.01); *B60W 60/001* (2020.02); *B60W 60/0015* (2020.02); *G01C 21/3407* (2013.01); *G02B 27/0172* (2013.01); *G06F 3/14* (2013.01); *G08G 1/143* (2013.01); *B60W 2050/146* (2013.01); *B60W 2556/50* (2020.02); *G02B 2027/0141* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 10,366,521 B1 * | 7/2019 | Peacock | G02B 27/017 |
| 2017/0124776 A1 * | 5/2017 | Carpentier | G07C 5/008 |
| 2019/0377343 A1 * | 12/2019 | Chan | G08G 1/202 |
| 2020/0117201 A1 * | 4/2020 | Oetken | G05D 1/0214 |
| 2021/0183148 A1 * | 6/2021 | Van Deventer | G06F 3/011 |
| 2021/0192450 A1 | 6/2021 | Bachant et al. | |
| 2021/0197847 A1 | 7/2021 | Galliano et al. | |
| 2021/0389152 A1 * | 12/2021 | Beaurepaire | G01C 21/3635 |

FOREIGN PATENT DOCUMENTS

WO    WO-2015000693 A1 *    1/2015    ........... G02B 27/017

* cited by examiner

*Primary Examiner* — Tuan C To
*Assistant Examiner* — David Ruben Pedersen

(57) ABSTRACT

Systems and methods for using augmented reality technology to provide on-site service center personnel with enhanced safety. In particular, augmented reality technology can be used to display autonomous vehicle driving paths to service center personnel. Additionally, systems and methods are provided for using augmented reality technology to improve efficiency of autonomous vehicle service centers and operating facilities. For example, augmented reality technology can be used to communicate services for respective autonomous vehicles to service center personnel. Augmented reality technology can be presented to users via augmented reality glasses.

20 Claims, 7 Drawing Sheets

AUGMENTED REALITY FOR PROVIDING AUTONOMOUS VEHICLE PERSONNEL WITH ENHANCED SAFETY AND EFFICIENCY

FIELD OF THE DISCLOSURE

The present disclosure relates generally to autonomous vehicles (AVs) and to systems and methods for using augmented reality technology to provide on-site personnel with enhanced safety and improved efficiency.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations.

According to an exemplary interaction scenario, an autonomous vehicle returns to a service center following a period of time on the road. Inside the service center, the autonomous vehicle drives to a designated space. Various services may be provided at the service center, such as charging the vehicle's battery, cleaning the vehicle exterior, cleaning the vehicle interior, arranging vehicle delivery containers, and checking vehicle tires. Additionally, the vehicle may need other services such as new brake pads or software updates. In general, various personnel at the service center may service the vehicle.

SUMMARY

Systems and methods are provided for using augmented reality technology to provide on-site service center personnel with enhanced safety. In particular, augmented reality technology can be used to display autonomous vehicle driving paths to service center personnel. Additionally, systems and methods are provided for using augmented reality technology to improve efficiency of autonomous vehicle service centers and operating facilities. For example, augmented reality technology can be used to communicate services for respective autonomous vehicles to service center personnel.

According to one aspect, a method for utilizing autonomous reality technology in a vehicle facility is provided, comprising: receiving planned route information for an autonomous vehicle, wherein the planned route information includes a driving path in the vehicle facility; receiving requested services for the autonomous vehicle; displaying the driving path for the autonomous vehicle in an augmented reality system; and presenting the requested services for the autonomous vehicle in the augmented reality system.

According to some implementations, displaying the driving path in the augmented reality system includes displaying the driving path in augmented reality glasses. In some implementations, displaying the driving path comprises superimposing the driving path over a view through the augmented reality glasses, when the view through the augmented reality glasses includes the driving path. In some implementations, presenting the requested services includes displaying the requested services in the augmented reality glasses when a view through the augmented reality glasses includes the autonomous vehicle. In some implementations, presenting the requested services includes providing an audio signal from the augmented reality glasses when a view through the augmented reality glasses includes the autonomous vehicle, wherein the audio signal lists the requested services. In some implementations, presenting the requested services for the autonomous vehicle includes presenting the requested services after the autonomous vehicle is parked in a designated parking space in the vehicle facility. In some implementations, presenting the requested services for the autonomous vehicle includes presenting a current state of the autonomous vehicle. In some implementations, the method further includes presenting safety hazard warnings in the augmented reality system.

According to another aspect, a system for utilizing autonomous reality technology in a vehicle facility comprises: a central computing system including a routing coordinator configured to route an autonomous vehicle to the vehicle facility for service; an onboard computing system in the autonomous vehicle configured to determine a driving path within the vehicle facility; and an augmented reality system configured to: receive planned route information for the autonomous vehicle, wherein the planned route information includes the driving path within the vehicle facility; and display the driving path of the autonomous vehicle.

In some implementations, the onboard computing system is further configured to determine service requests for the autonomous vehicle. In some implementations, the augmented reality system if further configured to receive the service requests for the autonomous vehicle, and present the service requests in the augmented reality system. In some implementations, the augmented reality system comprises augmented reality glasses. In some implementations, the augmented reality system is configured to display the driving path of the autonomous vehicle in the augmented reality glasses, when a view through the augmented reality glasses includes the driving path. In some implementations, the augmented reality system is further configured to present safety hazard warnings through the augmented reality glasses. In some implementations, the central computing system is further configured to designate a parking space in the vehicle facility to the autonomous vehicle. In some implementations, the central computing system is further configured to send an estimated time of arrival of the autonomous vehicle at the vehicle facility to the augmented reality system.

According to another aspect, an autonomous vehicle service facility for servicing an autonomous vehicle fleet comprises a central computing system configured to: receive arrival information for an autonomous vehicle, receive requested services for the autonomous vehicle, and assign a parking space to the autonomous vehicle; and an augmented reality system configured to: receive planned route information for the autonomous vehicle, wherein the planned route information includes a driving path in the facility; and display the driving path for the autonomous vehicle.

In some implementations, the augmented reality system is further configured to receive the requested services for the autonomous vehicle, and present the requested services. In some implementations, the augmented reality system comprises augmented reality glasses, and wherein the augmented reality glasses are configured to superimpose the driving path over a view through the augmented reality glasses, when the view through the augmented reality glasses includes the driving path. In some implementations, the augmented reality system if further configured to present safety hazard warnings.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
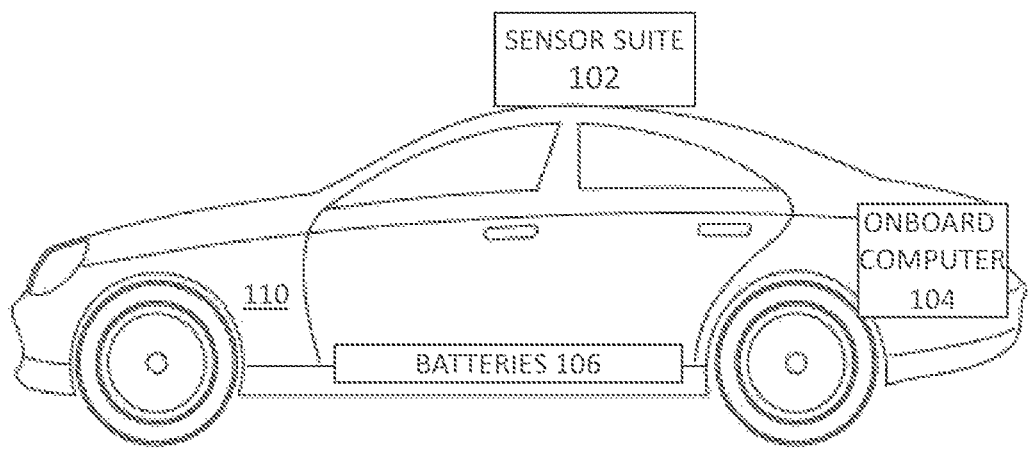
FIG. 1 is a diagram illustrating an autonomous vehicle, according to some embodiments of the disclosure.

Operating a large fleet of autonomous vehicles in (and out of) service and charging facilities creates many operational hazards to service center personnel. Autonomous vehicles do not have human drivers, and thus do not have the same human capability to communicate their path or movements inside operating facilities. This creates new operational challenges and hazards in the work environment. For example, the flow of autonomous vehicles in and out of a facility is not easily announced by the autonomous vehicles. Similarly, predicted start of movement of an autonomous vehicle inside a facility is not easily announced to personnel in the vicinity. In contrast, a human driver can make eye contact with personnel in the vicinity, indicate a route or direction of driving using a gesture, or otherwise ensure that people are aware a vehicle will be moving.

Additionally, there can be operational safety hazards in an autonomous vehicle service facility that go unnoticed due to lean staffing. In particular, due to automated driving capabilities, far fewer people are walking around the facility, and thus various safety hazards can remain undetected. Examples of safety hazards include water spills, overhanging objects, and other temporary hazards.

Furthermore, when an autonomous vehicle drives to a service and/or charging facility, there can be designated services to be performed on the autonomous vehicle at the facility. In some examples, the autonomous vehicle itself has flagged one or more services to be performed manually by onsite personnel, such as exterior cleaning, interior cleaning, tire pressure check, and/or fault check. When an autonomous vehicle returns the facility, on-site personnel do not know what services the autonomous vehicle needs.

In various implementations as discussed herein, augmented reality technology can be used to improve safety as well as to increase operational efficiency at service and charging facilities. For example, safety can be improved by using augmented reality technology, such as augmented reality glasses or displays, to display autonomous vehicle driving paths to service center personnel. Using augmented reality information, service center personnel can avoid walking in the paths where autonomous vehicles will be driving. Additionally, augmented reality technology can be used to alert service center personnel of various service/charging center hazards such as spills and overhanging objects.

In further implementations, augmented reality technology can be used to improve efficiency in service facilities by communicating flagged services for a particular vehicle. For example, augmented reality glasses can display the requested/flagged services for a particular autonomous vehicle when the glasses are directed towards the vehicle (i.e., when an augmented reality user turns their head toward the particular vehicle). In another example, augmented reality technology can be used to display requested/flagged services on various screens within the service center. In one example, a display associated with a particular parking space displays the requested services for a particular autonomous vehicle when the autonomous vehicle parks in the space.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Use with Augmented Reality

FIG. 1 is a diagram 100 illustrating an autonomous vehicle 110, according to some embodiments of the disclosure. The autonomous vehicle 110 includes a sensor suite 102, an onboard computer 104, and batteries 106. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for use with augmented reality technology. In particular, the autonomous vehicle 110 is configured to communicate selected information with an augmented reality system at service and/or charging facilities.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

The sensor suite 102 includes a plurality of sensors, and is coupled to the onboard computer 104, and the batteries 106. In some examples, the onboard computer 104 receives data captured by the sensor suite 102 and utilizes the data received from the sensors suite 102 in controlling operation of the autonomous vehicle 110. In some examples, one or more sensors in the sensor suite 102 are coupled to the batteries 106, and capture information regarding a state of charge of the batteries 106 and/or a state of health of the batteries 106. The batteries 106 are used for operation of the autonomous vehicle, for example to power the vehicle and to start the vehicle. In some implementations, the autonomous vehicle is an electric vehicle, and the batteries 106 provide power for movement of the vehicle among other operations of the vehicle. Furthermore, the batteries 106 power components of the autonomous vehicle including the sensor suite 102 and the onboard computer 104.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, the sensor suite 102 can be used to detect nearby passengers, for example via a rideshare application on passenger mobile devices. The sensor suite 102 can track movement of nearby passengers. In some implementations, the sensor suite 102 can be used to detect nearby autonomous vehicles in the same fleet as the autonomous vehicle 110, and track movement of nearby the autonomous vehicles.

In some implementations, data from the sensor suite 102 can be used to detect a passenger exiting a vehicle and/or to determine that a passenger has exited a vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. Additionally, the cameras can be used to automatically and/or manually capture images of passengers inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Interior sensors can be used to determine that the interior of the autonomous vehicle should be cleaned, and the onboard computer 104 can flag the vehicle for interior cleaning when the autonomous vehicle returns to a service center. Various exterior sensors can determine that the exterior of the vehicle should be cleaned, and the onboard computer 104 can flag the vehicle for exterior cleaning when the autonomous vehicle returns to a service center. Based upon the vehicle state and programmed instructions, the onboard computer 104 controls and/or modifies driving behavior of the autonomous vehicle 110.

In some implementations, the onboard computer 104 receives indications of the state of charge and/or state of health of the batteries 106 and determines operations to be performed by the autonomous vehicle 110 based on the state of the batteries 106. For example, the onboard computer 110 may determine the level of charge of the batteries 106, and the onboard computer 110 may determine that the batteries 106 need to be charged. In some implementations, based on a determined state of charge and/or state of health of the batteries 106, the onboard computer 106 may perform operations to address a condition of the batteries 106, such as causing the vehicle 106 to proceed to a charging station for charging the batteries 106 and causing charging of the batteries 106 to be stopped in response to determining the batteries 106 have been charged to a selected level of charge. In various implementations, the computer determines a state-of-charge of the batteries 106 based on a voltage of the batteries 106, a current drawn from the batteries 106, temperature of the batteries 106, other data related to the batteries 106, and/or a combination thereof.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles. In some examples, the onboard computer 104 maintains a list of service requests to be completed when the autonomous vehicle returns to a service facility.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Method for Augmented Reality System

Figure 2:
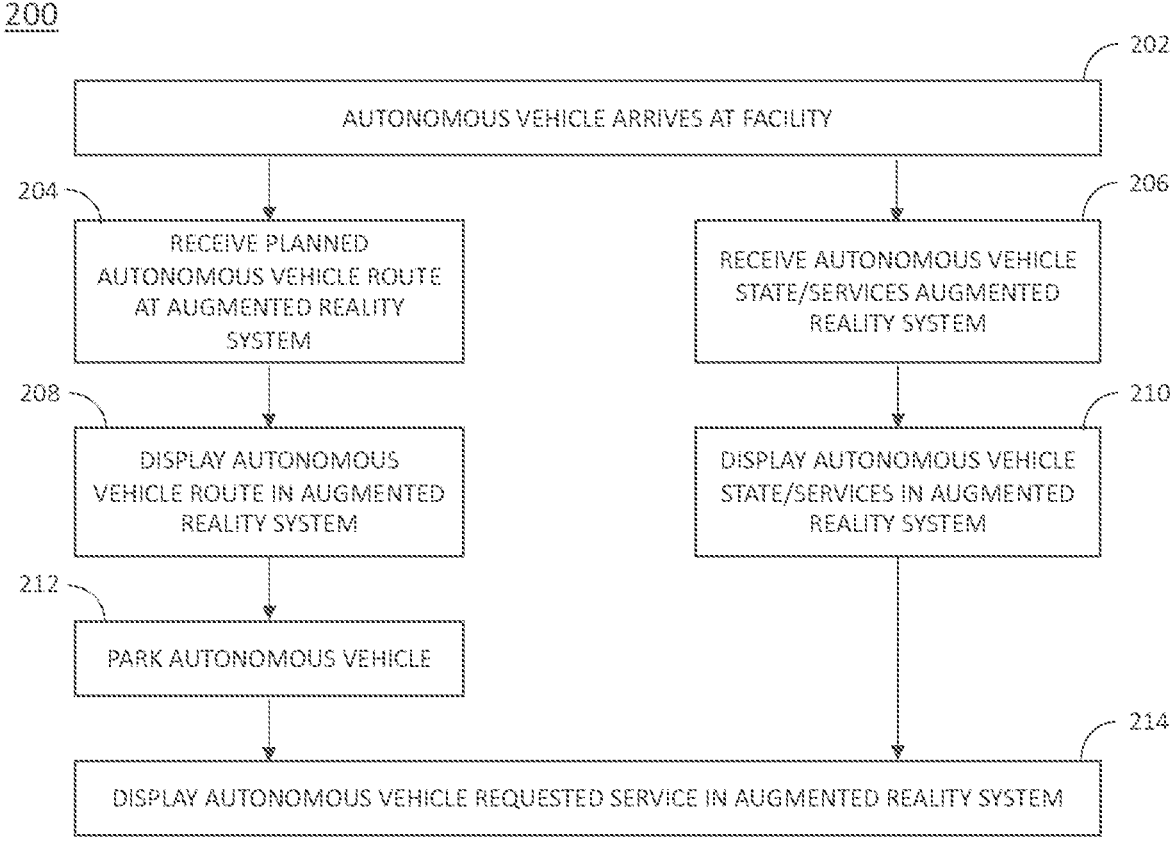
FIG. 2 is a diagram illustrating a method for using augmented reality technology in an autonomous vehicle service facility, according to various embodiments of the disclosure.

FIG. 2 is a diagram illustrating a method 200 for using augmented reality technology in an autonomous vehicle service facility, according to various embodiments of the disclosure. In particular, the method 200 is a method for using augmented reality technology glasses by personnel in a facility where autonomous vehicles are driving. In other examples, augmented reality technology can be used in displays in a facility, such as one various screens and/or monitors.

At step 202, an autonomous vehicle arrives at a facility. The autonomous vehicle may be outside the facility, or the autonomous vehicle may have entered a driveway or other facility property. In other examples, the autonomous vehicle's arrival is imminent but the autonomous vehicle is not yet at the facility. At step 204, the planned route of the autonomous vehicle within the facility is received by an augmented reality system. In some examples, the autonomous vehicle transmits its planned route to the augmented reality system. In other examples, the autonomous vehicle transmits its planned route to a central computing system, and the central computing system transmits the autonomous vehicle's planned route to the augmented reality system. In some examples, the central computing system determines the autonomous vehicle's route in the facility, and the central computing system transmits the planned route to both the autonomous vehicle and the augmented reality system. The planned route information can include one or more of the estimated time of arrival of the autonomous vehicle, as well as the drive path inside the facility, from the facility entry to a designated autonomous vehicle parking space.

At step 206, information about the autonomous vehicle's current state and/or any flagged or requested services is received by the augmented reality system. In some examples, the autonomous vehicle transmits its current state and requested services to the augmented reality system. In other examples, the autonomous vehicle transmits its current state and requested services to a central computing system, and the central computing system transmits the autonomous vehicle's current state and requested services to the augmented reality system. The current state of the autonomous vehicle can include one or more of the current state of charge of the autonomous vehicle, detected exterior cleanliness of the autonomous vehicle, detected interior cleanliness of the autonomous vehicle, any faults detected in the autonomous vehicle, a low tire pressure flag, and/or any other information about the condition of the autonomous vehicle. Flagged and/or requested services can include one or more of an interior cleaning request, and exterior cleaning request, a charge request, and/or a request to fix a diagnostic fault.

At step 208, the autonomous vehicle route is displayed in the augmented reality system. The planned route includes a drive path of the autonomous vehicle inside the facility. In some examples, the augmented reality system communicates the future autonomous vehicle movement by showing a ghost of the autonomous vehicle future drive path. In some implementations, facility personnel wear augmented reality glasses, and the autonomous vehicle future drive path is superimposed over the scene/view through the glasses, such that the wearer can see where the autonomous vehicle will be superimposed over the actual current scene/view through the glasses. Using augmented reality glasses, the wearer sees the future drive path of the autonomous vehicle when the wearer is looking through the glasses towards the future drive path. In some examples, the augmented reality system provides an audio status and/or audio alert.

In various implementations, the augmented reality system shows the future drive path of a vehicle if the autonomous vehicle will be on the drive path imminently (i.e., within a short period of time, such as within five seconds, within ten seconds, within twenty seconds, or within thirty seconds). In some examples, the augmented reality glasses alert the wearer if the wearer is stepping into the future drive path of an autonomous vehicle and is at risk of being in a location of the drive path when the autonomous vehicle is predicted to be there. That is, the augmented reality glasses alert the wearer if the wearer's path may interfere with the autonomous vehicle path and if the wearer is at risk of walking into or being hit by an autonomous vehicle.

In other implementations, there are screens, monitors, and/or other displays showing areas of the facility with future drive paths superimposed over the current scene/view. In general, the augmented reality system is designed to increase situational awareness of personnel and visitors at autonomous vehicle facilities, thereby improving operational efficiency and overall safety of facilities.

At step 210, the autonomous vehicle's current state and/or any flagged or requested services is displayed by the augmented reality system. In one example, the current state of the autonomous vehicle is displayed in augmented reality glasses when a wearer looks towards the autonomous vehicle. The current state can include one or more of the current state of charge of the autonomous vehicle, detected exterior cleanliness of the autonomous vehicle, detected interior cleanliness of the autonomous vehicle, any faults detected in the autonomous vehicle, a low tire pressure flag, and/or any other information about the condition of the autonomous vehicle. Additionally, in various examples, any flagged and/or requested services for the autonomous vehicle are displayed in augmented reality glasses when a wearer looks towards the autonomous vehicle. Flagged and/or requested services can include one or more of an interior cleaning request, and exterior cleaning request, a charge request, a request to fix a diagnostic fault, a request to add air to tires, and/or any other service request. In some examples, the augmented reality system provides an audio feedback regarding requested services and/or state of an autonomous vehicle.

In some implementations, the autonomous vehicle's current state and/or requested services is presented on a monitor, screen, or other display. In some examples, there is a display is associated with the autonomous vehicle's parking space, which shows the autonomous vehicle's current state and requested services. In some examples, the display associated with the autonomous vehicle's parking space shows the autonomous vehicle's current state and requested services before the autonomous vehicle arrives at the facility and/or before the autonomous vehicle arrives at the parking space. In some examples, while the autonomous vehicle is en route to the parking space, the display shows the estimated time of arrival of the incoming autonomous vehicle and/or the autonomous vehicle's identification number, along with its current state and any requested services.

At step 212, the autonomous vehicle parks in a designated parking space. Once the autonomous vehicle is parked, its future drive path is not displayed again until it is imminently scheduled to leave the facility.

Method for Augmented Reality Glasses

Figure 3:
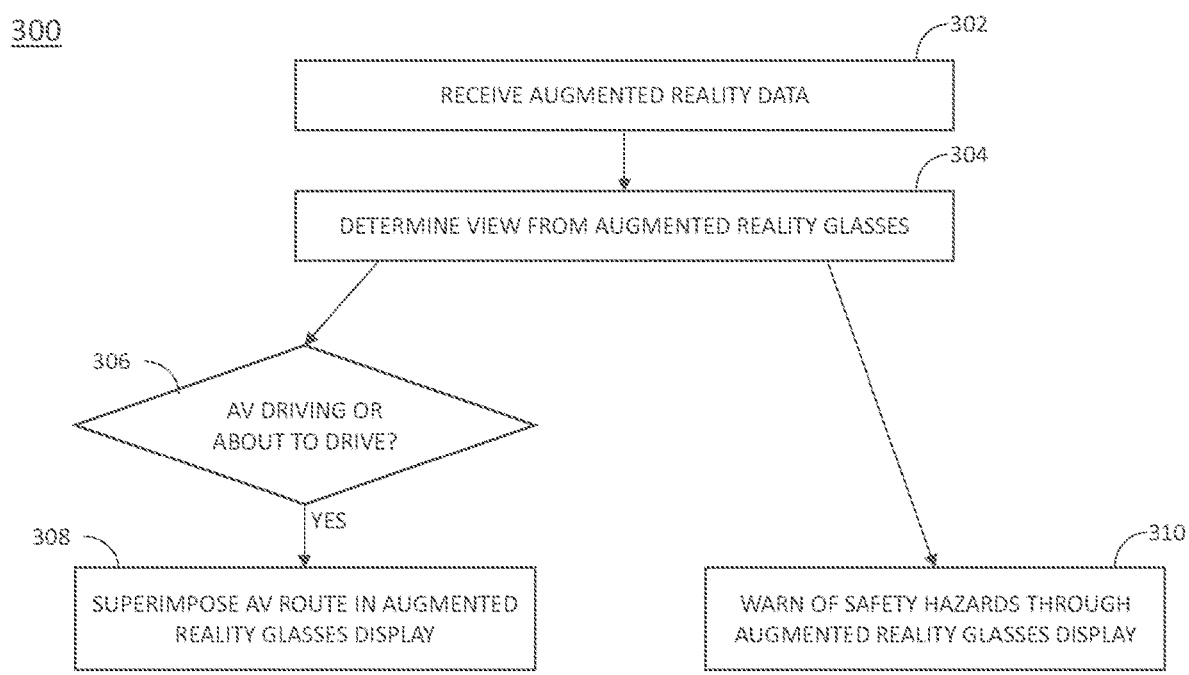
FIG. 3 is a diagram illustrating a method for using augmented reality technology glasses in an autonomous vehicle service facility, according to various embodiments of the disclosure.

FIG. 3 is a diagram illustrating a method 300 for using augmented reality technology glasses in an autonomous vehicle service facility, according to various embodiments of the disclosure. At step 302, augmented reality data is received. As discussed above, the augmented reality data for a particular autonomous vehicle may be transmitted from the autonomous vehicle to the augmented reality system or the augmented reality data for a particular autonomous vehicle may be transmitted from a central computing system. The augmented reality data for an autonomous vehicle can include one or more of future drive path, estimated time of arrival at a facility, estimated time of arrival at a parking space, departure warning, and/or an estimated time of departure. Additionally, augmented reality data is received from various monitors in the facility. In particular, various hazards or other information within the facility can be transmitted to the augmented reality system for communication to the augmented reality glasses.

At step 304, the view from the augmented reality glasses is determined. When in use, the glasses move with the wearer's head, and the augmented reality system is designed to superimpose augmented reality data over the view through the glasses. Safety data, for example, is superimposed over the location of the safety hazard. Autonomous vehicle future drive path data is superimposed over the future drive path as viewed through the glasses. Additionally, information about the state of an autonomous vehicle and any flagged services for the autonomous vehicle is displayed when the autonomous vehicle is viewed through the augmented reality glasses. Thus, the view from the augmented reality glasses is determined by the augmented reality system to determine what information to display in the glasses.

At step 306, the augmented reality system determines if an autonomous vehicle is driving through the view through the augmented reality glasses or if an autonomous vehicle is about to drive through the view through the augmented reality glasses (i.e., if the autonomous vehicle drive path is in the view of the augmented reality glasses). If yes, at step 308, future drive path of the vehicle is superimposed on the view through augmented reality glasses, such that the wearer can see where the autonomous vehicle will be superimposed over the actual current scene/view through the glasses. In some examples, the augmented reality glasses alert the wearer if the wearer is stepping into the future drive path of an autonomous vehicle and is at risk of being in a location of the drive path when the autonomous vehicle is predicted to be there. That is, the augmented reality glasses alert the wearer if the wearer's path may interfere with the autonomous vehicle path and if the wearer is at risk of walking into (or being hit by) an autonomous vehicle. The alert can be one or more of a visual alert and an audible alert.

At step 310, the augmented reality system uses the information about the view through the augmented reality glasses to warn the wearer of any safety hazards present in the vicinity, that are viewable through the glasses. In some examples, the augmented reality system displays potential safety hazards in the view through the augmented reality glasses. In some examples, the augmented reality system audibly warns the user of potential safety hazards. Examples of various safety hazards are based on the user's location and path, as well as the view through the augmented reality glasses. Examples of various safety hazards include one or more of an approaching object warning (e.g., an approaching autonomous vehicle or other moving object within the facility), detected water, chemical, or other fluid leak on the ground (automatically detected or flagged by personnel), temperature detection and warning if the temperature is outside a given comfort zone, overhanging object detection and warning, and notification of facility repairs or other temporary actions. In various implementations, the safety hazards are communicated from the facility to an operator or technician wearing augmented reality glasses, through the augmented reality glasses.

As shown in FIG. 3, at step 304 the method 300 can proceed to steps 306 and 308, and, at step 304 the method 300 can proceed to step 310. According to various implementations, at step 304, the method 300 can simultaneously proceed to steps 306 and 308 as well as to step 310. In some examples, the augmented reality glasses superimpose an autonomous vehicle route in the augmented reality display while also warning of safety hazards through the augmented reality display.

In some implementations, the augmented reality glasses can also be used to detect pedestrian walkways and warn a wearer if their path is deviating off the walkway. For example, based on the movement of the user, the augmented reality glasses predict where the user will be in the next few seconds, and alert the user if their path is likely to take them off the designated pedestrian walkway.

In some implementations, the augmented reality glasses detect signs within the garage and alert the user of the signs (including information on the signs). This can include warning signs when a pedestrian walkway crosses a driving path, as well as warning signs for temporary hazards, such as slippery floors, spills, and overhanging objects.

In various implementations, the augmented reality glasses can also be used to push notifications to the wearer. Push notifications might include one or more of safety alerts, break reminders for workforce, and an alert if a wearer is using a cell phone while walking in the garage. In some examples, the augmented reality glasses include two-way communication and messaging capabilities, such that a wearer can use the glasses to communicate and/or send a message to others.

Example Augmented Reality Technology Glasses

Figure 4A:
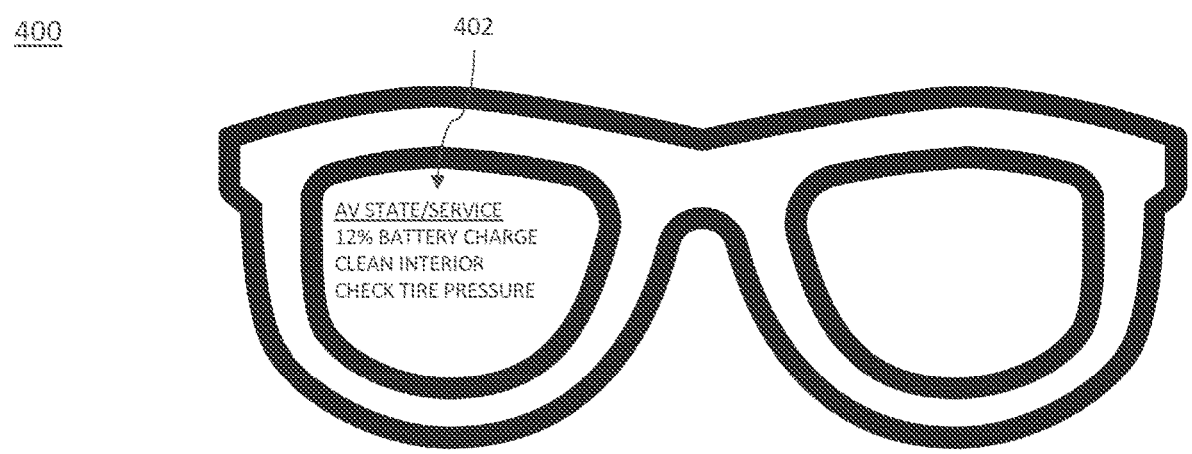
FIGS. 4A-4B illustrate augmented reality technology glasses, according to some embodiments of the disclosure.
Figure 4B:
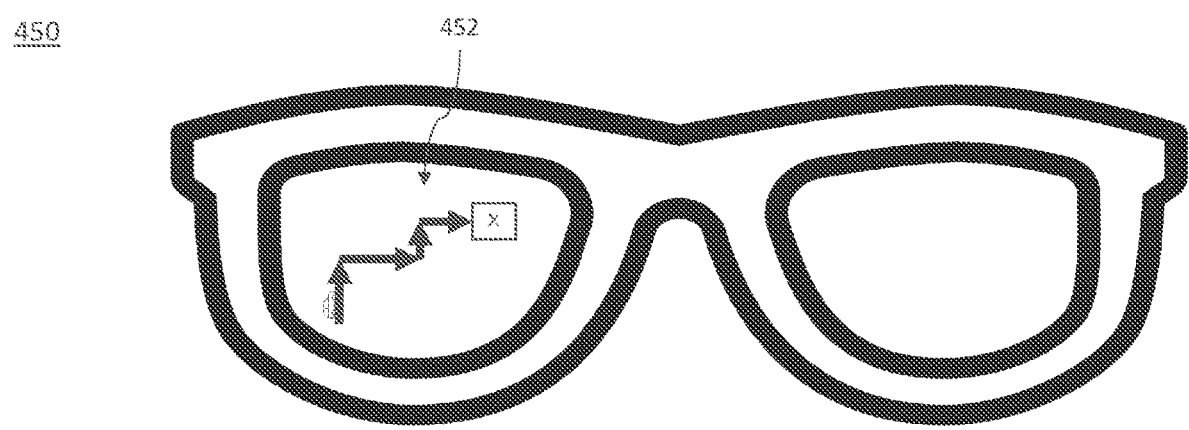

FIGS. 4A-4B illustrate augmented reality technology glasses, according to various embodiments of the disclosure. FIG. 4A illustrates a pair of augmented reality glasses 400 showing information 402 about an autonomous vehicle. In various implementations, the information 402 shown in the augmented reality glasses 400 is displayed when a user looks at the respective autonomous vehicle. In some examples, the information 402 is shown in the augmented reality glasses 400 when the autonomous vehicle is parked and/or stopped, and not while it is driving to a parking space. In the example of FIG. 4A, the autonomous vehicle the user is looking at has a 12% battery charge, requests a cleaning of the interior, and requests a tire pressure check.

FIG. 4B illustrates a pair of augmented reality glasses 450 showing the future drive path 452 of an autonomous vehicle. In various implementations, the future drive path 452 shown in the augmented reality glasses 450 of FIG. 4B is displayed when a user looks towards the future drive path 452. That is, the user may not see an autonomous vehicle through the glasses, but can see the drive path 452 showing where an autonomous vehicle will be imminently. In some examples, the drive path 452 is shown in "ghost" writing, such that the user can see through the superimposed drive path 452. The drive path 452 also shows the parking space where the autonomous vehicle will park, because the parking space is within the view through the augmented reality glasses 450. In various examples, the drive path 452 shown through the augmented reality glasses includes parts of the drive path 452 that are visible in the view through the augmented reality glasses 450.

In some examples, the augmented reality glasses 400 and/or 450 include a camera for receiving a view through the augmented reality glasses 400 and/or 450. In some examples, the augmented reality glasses are used to play a safety video to a user before the user enters an autonomous vehicle facility. In some examples, the augmented reality glasses can be used to help an operator navigate to a selected location within an autonomous vehicle facility.

In other implementations, the augmented reality glasses 400 and/or 450 display safety information, including one or more alerts to the wearer of any safety hazards present in the vicinity. In some examples, the alerts are for safety hazards that are viewable through the glasses, while in some examples, the alerts are for imminent safety hazards that are not yet within the augmented reality glasses view. In some examples, the alert is displayed in the augmented reality glasses, while in some examples, the alert is an audio alert. In various implementations, the safety hazards are communicated from the facility to an operator or technician wearing augmented reality glasses, through the augmented reality glasses.

In various implementations, safety hazards alerts are based on the user's location and path, as well as the view through the augmented reality glasses. There are many potential safety hazards that the augmented reality glasses may alert a user of. One safety hazard is an approaching object warning (e.g., an approaching autonomous vehicle, facility camera, or other moving object in the facility). Another safety hazard is a detected water spill, chemical spill, or other fluid leak on the ground. A spill or fluid leak may be automatically detected by sensors and/or cameras within the facility, or the spill or fluid leak may be identified by facility personnel. Another potential safety hazard that the augmented reality glasses can alert a user of is a detected temperature that is outside a selected comfort zone. Another safety hazard that can be detected by the augmented reality system is an overhanging object. In some examples, a user may walk into the overhanging object if not alerted to its presence. Thus the augmented reality glasses are configured to alert a wearer of detected overhanging objects. Additionally, in various implementations, the facility may be undergoing repairs or maintenance, creating temporary changes to the facility which can be hazardous. Thus, the augmented reality system can be configured to warn the user of any facility repairs.

In some implementations, the augmented reality glasses 400 and/or 450 detect signs within the garage and alert the user of the signs (including information on the signs). This can include warning signs when a pedestrian walkway crosses a driving path, as well as warning signs for temporary hazards, such as slippery floors, spills, and overhanging objects.

In various implementations, the augmented reality glasses 400 and/or 450 can also be used to push notifications to the wearer. Push notifications might include one or more of safety alerts, break reminders for workforce, and an alert if a wearer is using a cell phone while walking in the garage. In some examples, the augmented reality glasses 400 and/or 450 include two-way communication and messaging capabilities, such that a wearer can use the glasses to communicate and/or send a message to others.

Example of Autonomous Vehicle Fleet

Figure 5:
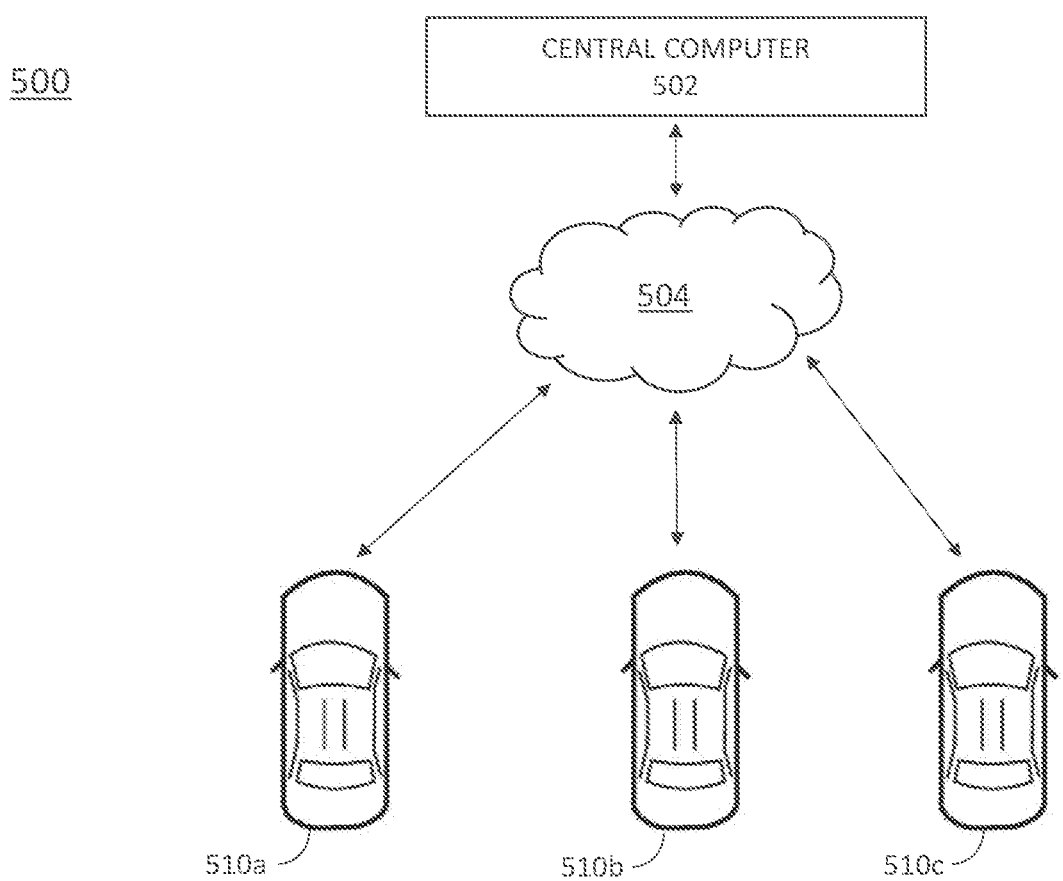
FIG. 5 is a diagram illustrating a fleet of autonomous vehicles in communication with a central computer, according to some embodiments of the disclosure.

FIG. 5 is a diagram 500 illustrating a fleet of autonomous vehicles 510a, 510b, 510c in communication with a central computer 502, according to some embodiments of the disclosure. As shown in FIG. 5, the vehicles 510a-510c communicate wirelessly with a cloud 504 and a central computer 502. The central computer 502 includes a routing coordinator and a database of information from the vehicles 510a-510c in the fleet. Autonomous vehicle fleet routing refers to the routing of multiple vehicles in a fleet. The central computer also acts as a centralized ride management system and communicates with rideshare users via a rideshare service 506. The vehicles 510a-510c can each be used in implementation of the augmented reality technology systems and methods of FIGS. 2, 3, and 4A-4D. In some implementations, the autonomous vehicles 510a-510c communicate directly with each other. In some implementations, each of the autonomous vehicles 510a-510c includes a wireless ranging technology unit.

When a passenger requests a ride through a rideshare service 506, the rideshare service 506 sends the request to central computer 502. The central computer 502 selects a vehicle 510a-510c based on the request. The vehicles 510a, 510b, 510c communicate with a central computer 502 via a cloud 504. In some implementations, the vehicles 510a, 510b, 510c transmit respective planned drive paths to the central computer 502. Additionally, the vehicles 510a, 510b, 510c transmit respective service requests to the central computer 502. Within autonomous vehicle facilities, the planned drive paths can be used by augmented reality technology systems to communicate autonomous vehicle information to personnel in the facilities.

With regards to the rideshare service, once a destination is selected and the user has ordered a vehicle, the routing coordinator can optimize the routes to avoid traffic as well as to optimize vehicle occupancy. In some examples, an additional passenger can be picked up en route to the destination, and the additional passenger can have a different destination. In various implementations, since the routing coordinator has information on the routes for all the vehicles in the fleet, the routing coordinator can adjust vehicle routes to reduce congestion and increase vehicle occupancy. Additionally, the routing coordinator can optimize the timing for when an autonomous vehicle returns to a facility for charging and/or service. Note that in order for the routing coordinator to optimize routes and increase vehicle occupancy, it is important that passengers ride in the assigned vehicle and not a different vehicle in the fleet that is also present for a passenger pick-up at the same location.

As described above, each vehicle 510a-510c in the fleet of vehicles communicates with a routing coordinator. Thus, information gathered by various autonomous vehicles 510a-510c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, the routing coordinator uses collected position data corresponding to emergency events to generate a best route for an autonomous vehicle to avoid a potential emergency situation or road hazard that could result in a service request.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, view from the vehicle of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger). In some examples, there is a specific set of routing goals within a service facility to optimize operations and improve safety at the facility.

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 502 generates a route for each selected autonomous vehicle 510a-510c, and the routing coordinator determines a route for the autonomous vehicle 510a-510c to travel from the autonomous vehicle's current location to a destination. When an autonomous vehicle is due for recharging or for service, the routing coordinator sends the selected autonomous vehicle a request to drive to a service facility destination.

Example of a Computing System for Ride Requests

Figure 6:
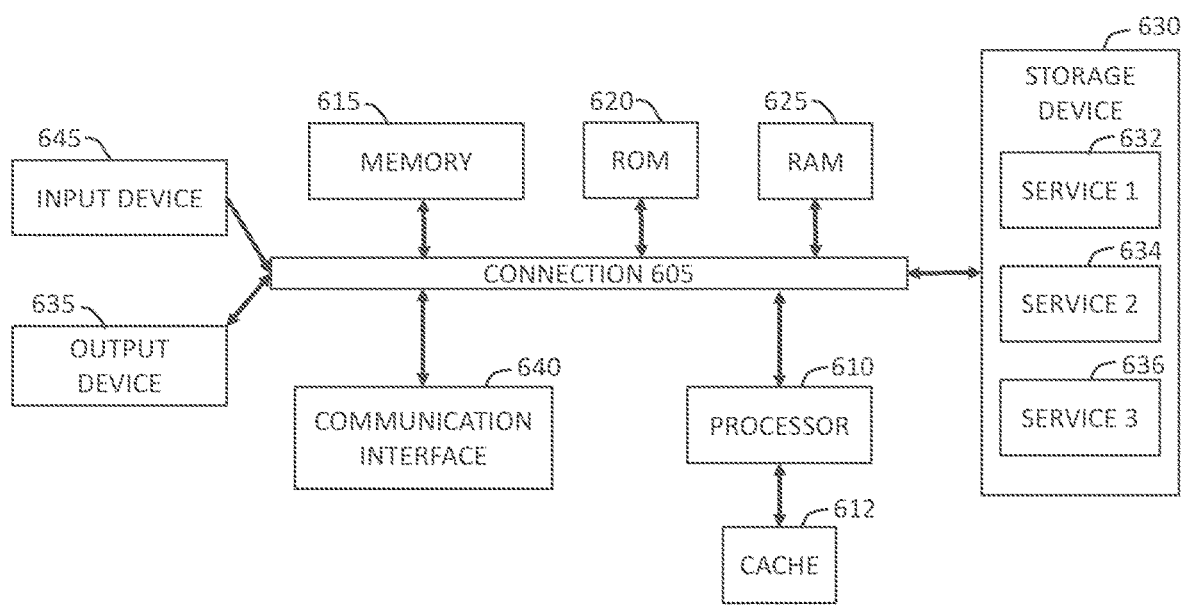
FIG. 6 shows an example embodiment of a system for implementing certain aspects of the present technology.

FIG. 6 shows an example embodiment of a computing system 600 for implementing certain aspects of the present technology. In various examples, the computing system 600 can be any computing device making up the onboard computer 104, the central computing system 502, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 600 includes at least one processing unit (CPU or processor) 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for utilizing autonomous reality technology in a vehicle facility, comprising: receiving planned route information for an autonomous vehicle, wherein the planned route information includes a driving path in the vehicle facility; receiving requested services for the autonomous vehicle; displaying the driving path for the autonomous vehicle in an augmented reality system; and presenting the requested services for the autonomous vehicle in the augmented reality system.

Example 2 provides a method according to one or more of the preceding and/or following examples, wherein displaying the driving path in the augmented reality system includes displaying the driving path in augmented reality glasses.

Example 3 provides a method according to one or more of the preceding and/or following examples, wherein displaying the driving path comprises superimposing the driving path over a view through the augmented reality glasses, when the view through the augmented reality glasses includes the driving path.

Example 4 provides a method according to one or more of the preceding and/or following examples, wherein presenting the requested services includes displaying the requested services in the augmented reality glasses when a view through the augmented reality glasses includes the autonomous vehicle.

Example 5 provides a method according to one or more of the preceding and/or following examples, wherein presenting the requested services includes providing an audio signal from the augmented reality glasses when a view through the augmented reality glasses includes the autonomous vehicle, wherein the audio signal lists the requested services.

Example 6 provides a method according to one or more of the preceding and/or following examples, wherein presenting the requested services for the autonomous vehicle includes presenting the requested services after the autonomous vehicle is parked in a designated parking space in the vehicle facility.

Example 7 provides a method according to one or more of the preceding and/or following examples, wherein presenting the requested services for the autonomous vehicle includes presenting a current state of the autonomous vehicle.

Example 8 provides a method according to one or more of the preceding and/or following examples, further comprising presenting safety hazard warnings in the augmented reality system.

Example 9 provides a system for utilizing autonomous reality technology in a vehicle facility, comprising: a central computing system including a routing coordinator configured to route an autonomous vehicle to the vehicle facility for service; an onboard computing system in the autonomous vehicle configured to determine a driving path within the vehicle facility; and an augmented reality system configured to: receive planned route information for the autonomous vehicle, wherein the planned route information includes the driving path within the vehicle facility; and display the driving path of the autonomous vehicle.

Example 10 provides a system according to one or more of the preceding and/or following examples, wherein the onboard computing system is further configured to determine service requests for the autonomous vehicle.

Example 11 provides a system according to one or more of the preceding and/or following examples, wherein the augmented reality system if further configured to receive the service requests for the autonomous vehicle, and present the service requests in the augmented reality system.

Example 12 provides a system according to one or more of the preceding and/or following examples, wherein the augmented reality system comprises augmented reality glasses.

Example 13 provides a system according to one or more of the preceding and/or following examples, wherein the augmented reality system is configured to display the driving path of the autonomous vehicle in the augmented reality glasses, when a view through the augmented reality glasses includes the driving path.

Example 14 provides a system according to one or more of the preceding and/or following examples, wherein the augmented reality system is further configured to present safety hazard warnings through the augmented reality glasses.

Example 15 provides a system according to one or more of the preceding and/or following examples, wherein the central computing system is further configured to designate a parking space in the vehicle facility to the autonomous vehicle.

Example 16 provides a system according to one or more of the preceding and/or following examples, wherein the central computing system is further configured to send an estimated time of arrival of the autonomous vehicle at the vehicle facility to the augmented reality system.

Example 17 provides an autonomous vehicle service facility for servicing an autonomous vehicle fleet, comprising a central computing system configured to: receive arrival information for an autonomous vehicle, receive requested services for the autonomous vehicle, and assign a parking space to the autonomous vehicle; and an augmented reality system configured to: receive planned route information for the autonomous vehicle, wherein the planned route information includes a driving path in the facility; and display the driving path for the autonomous vehicle.

Example 18 provides a service facility according to one or more of the preceding and/or following examples, wherein the augmented reality system is further configured to receive the requested services for the autonomous vehicle, and present the requested services.

Example 19 provides a service facility according to one or more of the preceding and/or following examples, wherein the augmented reality system comprises augmented reality glasses, and wherein the augmented reality glasses are configured to superimpose the driving path over a view through the augmented reality glasses, when the view through the augmented reality glasses includes the driving path.

Example 20 provides a service facility according to one or more of the preceding and/or following examples, wherein the augmented reality system if further configured to present safety hazard warnings.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for utilizing augmented reality technology in a vehicle facility, comprising:
   receiving, by augmented reality glasses worn by a wearer, planned route information for an autonomous vehicle, wherein the planned route information includes a driving path in the vehicle facility and the planned route information is received by the augmented reality glasses in response to a planned arrival of the autonomous vehicle within the vehicle facility within a prescribed time period;
   receiving requested maintenance services for the autonomous vehicle;
   displaying the driving path for the autonomous vehicle in an augmented reality system, including automatically displaying the driving path in the augmented reality glasses, wherein automatically displaying the driving path comprises automatically superimposing the driving path over a view through the augmented reality glasses, when the view through the augmented reality glasses includes the driving path;
   identifying an approaching object nearing the wearer of the augmented reality glasses;
   predicting, by the augmented reality glasses based on wearer movement, a wearer path of the wearer of the augmented reality glasses, including predicting the wearer path deviates from a pedestrian walkway;
   identifying a potential collision between the wearer of the augmented reality glasses and the approaching object;
   presenting a push notification in the augmented reality glasses, wherein the push notification alerts the wearer of the approaching object and the potential collision;
   determining, based on the wearer path, that the wearer of the augmented reality glasses is predicted to step into a future segment of the driving path of the autonomous vehicle and at risk of being in the driving path concurrently with the autonomous vehicle, based on a predicted timing of the autonomous vehicle driving along the driving path:
   alerting the wearer of the risk, via the augmented reality glasses; and
   presenting the requested maintenance services for the autonomous vehicle in the augmented reality system, including displaying the requested maintenance services in the augmented reality glasses when a view through the augmented reality glasses includes the autonomous vehicle.

2. The method of claim 1, wherein presenting the requested maintenance services includes providing an audio signal from the augmented reality glasses when a view through the augmented reality glasses includes the autonomous vehicle, wherein the audio signal lists the requested maintenance services.

3. The method of claim 1, wherein presenting the requested maintenance services for the autonomous vehicle includes presenting the requested maintenance services after the autonomous vehicle is parked in a designated parking space in the vehicle facility.

4. The method of claim 1, wherein presenting the requested maintenance services for the autonomous vehicle includes presenting a current state of the autonomous vehicle.

5. The method of claim 1, further comprising presenting safety hazard warnings in the augmented reality system.

6. A system for utilizing augmented reality technology in a vehicle facility, comprising:
- a central computing system including a routing coordinator configured to route an autonomous vehicle to the vehicle facility for service;
- an onboard computing system in the autonomous vehicle configured to navigate the autonomous vehicle along a driving path within the vehicle facility; and
- an augmented reality system configured to:
  - receive, by augmented reality glasses worn by a wearer, planned route information for the autonomous vehicle, wherein the planned route information includes the driving path within the vehicle facility and the planned route information is received by the augmented reality glasses in response to a planned arrival of the autonomous vehicle within the vehicle facility within a prescribed time period;
  - display the driving path of the autonomous vehicle, including displaying the driving path in the augmented reality glasses, wherein displaying the driving path comprises automatically superimposing the driving path over a view through the augmented reality glasses, when the view through the augmented reality glasses includes the driving path;
  - detect an approaching object nearing the wearer of the augmented reality glasses;
  - predict, by the augmented reality glasses based on wearer movement, a wearer path of the wearer of the augmented reality glasses, including predicting the wearer path deviates from a pedestrian walkway;
  - identify a potential collision between the wearer of the augmented reality glasses and the approaching object;
  - present a push notification in the augmented reality glasses, wherein the push notification alerts the wearer of the approaching object and the potential collision;
  - determine, based on the wearer path, that the wearer of the augmented reality glasses is predicted to step into a future segment of the driving path of the autonomous vehicle and at risk of being in the driving path concurrently with the autonomous vehicle, based on a predicted timing of the autonomous vehicle driving along the driving path;
  - alert the wearer of the risk, via the augmented reality glasses; and
  - present a requested maintenance service for the autonomous vehicle in the augmented reality system, including displaying the requested maintenance service in the augmented reality glasses when a view through the augmented reality glasses includes the autonomous vehicle.

7. The system of claim 6, wherein the onboard computing system is further configured to determine the requested maintenance service for the autonomous vehicle.

8. The system of claim 7, wherein the augmented reality system is further configured to receive the requested maintenance service for the autonomous vehicle.

9. The system of claim 6, wherein the augmented reality system is further configured to present safety hazard warnings through the augmented reality glasses.

10. The system of claim 6, wherein the central computing system is further configured to designate a parking space in the vehicle facility to the autonomous vehicle.

11. The system of claim 6, wherein the central computing system is further configured to send an estimated time of arrival of the autonomous vehicle at the vehicle facility to the augmented reality system.

12. An autonomous vehicle service facility for servicing an autonomous vehicle fleet, comprising:
- a central computing system configured to:
  - receive arrival information for an autonomous vehicle,
  - receive a requested maintenance service for the autonomous vehicle, and
  - assign a parking space to the autonomous vehicle; and
- an augmented reality system configured to:
  - receive, by augmented reality glasses worn by a wearer, planned route information for the autonomous vehicle, wherein the planned route information includes a driving path in the facility and the planned route information is received by the augmented reality glasses in response to a planned arrival of the autonomous vehicle within the vehicle facility within a prescribed time period,
  - display the driving path for the autonomous vehicle, including automatically displaying the driving path in the augmented reality glasses, wherein automatically displaying the driving path comprises automatically superimposing the driving path over a view through the augmented reality glasses, when the view through the augmented reality glasses includes the driving path,
  - detect an approaching object nearing the wearer of the augmented reality glasses, predict, based on wearer movement, a wearer path of the wearer of the augmented reality glasses, including predicting the wearer path deviates from a pedestrian walkway,
  - identify a potential collision between the wearer of the augmented reality glasses and the approaching object,
  - present a push notification in the augmented reality glasses, wherein the push notification alerts the wearer of the approaching object and the potential collision,
  - determine, based on the wearer path, that the wearer of the augmented reality glasses is predicted to step into a future segment of the driving path of the autonomous vehicle and at risk of being in the driving path concurrently with the autonomous vehicle, based on a predicted timing of the autonomous vehicle driving along the driving path,
  - alert the wearer of the risk, via the augmented reality glasses, and
  - present the requested maintenance service for the autonomous vehicle in the augmented reality system, including displaying the requested maintenance service in the augmented reality glasses when a view through the augmented reality glasses includes the autonomous vehicle.

13. The service facility of claim 12, wherein the augmented reality system is further configured to present safety hazard warnings.

14. The method of claim 1, wherein the approaching object is one of a facility camera, and an overhanging object.

15. The method of claim 1, wherein the push notification is a first push notification and further comprising presenting a second push notification in the augmented reality glasses, wherein the second push notification includes a break reminder.

16. The system of claim 6, wherein the approaching object is one of a facility camera, and an overhanging object.

17. The service facility of claim 12, wherein the approaching object is one of a facility camera, and an overhanging object.

18. The method of claim 1, wherein predicting the wearer path includes predicting, based on the wearer movement, where the user will be within a set time period, and further comprising alerting the wearer that the wearer path deviates from the pedestrian walkway.

19. The method of claim 1, further comprising presenting a safety video to the wearer via the augmented reality glasses.

20. The method of claim 18, wherein predicting the wearer path includes determining that the wearer path interferes with the driving path.

* * * * *